United States Patent [19]

Micke

[11] 4,383,593
[45] May 17, 1983

[54] HYDRAULICALLY AND MECHANICALLY OPERABLE DISC BRAKES

[75] Inventor: Sigma Micke, Koblenz, Fed. Rep. of Germany

[73] Assignee: Lucas Industries Limited, Birmingham, England

[21] Appl. No.: 258,403

[22] Filed: Apr. 28, 1981

[30] Foreign Application Priority Data

May 9, 1980 [GB] United Kingdom ............... 8015486

[51] Int. Cl.³ .................. F16D 51/04; F16D 51/06; F16D 55/39; F16D 55/40
[52] U.S. Cl. .................. 188/71.4; 188/71.5; 188/72.2; 188/72.6; 188/72.7
[58] Field of Search ............... 188/71.1, 71.3, 71.4, 188/71.5, 72.1, 72.2, 72.4, 72.6, 71.7, 72.7, 72.8, 106 F, 218 XL; 192/83, 93 A, 107 R

[56] References Cited

U.S. PATENT DOCUMENTS

| | | | |
|---|---|---|---|
| 2,144,223 | 1/1939 | Klocke | 192/107 R |
| 2,605,877 | 8/1952 | Winther | 192/107 R |
| 2,874,807 | 2/1959 | Hahn | 188/72.6 |
| 2,916,105 | 12/1959 | Dasse et al. | 188/71.5 |
| 3,199,374 | 8/1965 | O'Malley et al. | 188/72.2 |
| 3,412,836 | 11/1968 | Wilmer | 188/218 XL |
| 3,543,886 | 12/1970 | Campbell | 188/72.2 |
| 3,583,529 | 6/1971 | Robinson | 188/71.4 |
| 3,674,118 | 7/1972 | Klaue | 188/72.8 |
| 3,701,400 | 10/1972 | Burnett et al. | 188/72.6 |
| 3,734,242 | 5/1973 | Klaue | 188/71.4 |
| 3,915,262 | 10/1975 | Klaue | 188/72.6 |
| 3,920,102 | 11/1975 | Ito | 188/72.8 |
| 3,951,240 | 4/1976 | Dowell et al. | 192/107 R |
| 4,179,016 | 12/1979 | Alderman et al. | 188/71.4 |
| 4,213,519 | 7/1980 | Moser et al. | 188/71.4 |

FOREIGN PATENT DOCUMENTS 1009958  6/1957  Fed. Rep. of Germany ... 192/107 R

*Primary Examiner*—Douglas C. Butler
*Assistant Examiner*—R. R. Diefendorf
*Attorney, Agent, or Firm*—Scrivener, Clarke, Scrivener and Johnson

[57] ABSTRACT

A housing for a disc brake incorporates an expander mechanism formed by two pressure plates and, a stack of friction discs between one plate and a braking surface, and a single friction disc between the other plate and another braking surface. The one plate is formed by separate inner and outer concentric rings, and the inner ring and the other plate are slidably coupled against relative angular movement. In normal braking an annular piston works in an annular hydraulic cylinder in the other plate to urge the inner ring and the plate axially apart so that the single friction disc engages with the braking surface and the inner ring engages with a corresponding inner ring of friction lining material on the adjacent disc of the stack, thus urging the stack into engagement with the braking surface. The brake can also be applied mechanically through a transmission member or by an hydraulic actuator by moving the outer ring angularly with respect to the other plate causing balls to ride out of inclined recesses in adjacent faces of the outer ring and plate so that the outer ring engages with a corresponding outer ring of friction lining material on the adjacent disc of the stack. In this manner of operation a servo effect is obtained and helical movement of the annular piston is eliminated.

15 Claims, 5 Drawing Figures

HYDRAULICALLY AND MECHANICALLY OPERABLE DISC BRAKES

SPECIFIC DESCRIPTION

This invention relates to disc brakes of the kind in which at least one rotatable friction disc is adapted to co-operate with a radial surface in a stationary housing by means of actuating means within the housing and the actuating means incorporates at least one pressure plate adapted to be subjected to an axial component of brake-applying movement so that the pressure plate can engage with a friction lining on the friction disc to urge it into co-operation with the radial surface.

In some known brakes of the kind set forth balls are located in co-operating oppositely inclined recesses in the pressure plate and in another complementary member and the application of the brake can be initiated either by moving the pressure plate angularly, or by moving it axially. In each case, upon engagement of the pressure plate with the friction disc, the pressure plate will be carried round with the friction disc to produce a servo action causing the balls to tend to ride out of the recesses and enhance the axial component of the brake-applying movement.

The angular movement of the pressure plate can be effected by a lever or link acting on a lug on the pressure plate, suitably for mechanical operation for parking or emergency braking, and the axial movement of the pressure plate can be effected, suitably for service braking, by an annular hydraulic piston and cylinder assembly which is incorporated in an assembly defined by the pressure plate and the said complementary member.

In such a known construction angular movement of the pressure plate can cause the piston to perform a helical movement in the cylinder, which is likely to cause damage to the seals, with the inherent problem of air being sucked into the cylinder upon release of the brake. Helical movement of the piston can be eliminated by providing a bearing between the piston and cylinder assembly and the pressure plate. This is undesirable since the bearing would have to be of substantial diameter and therefore very expensive. In addition it is also desirable to ensure that, irrespective of whether the brake is being applied for parking or emergency braking, or for normal service braking, different parts of the brake co-operate. This will ensure that fade in one of the two brake-applying modes will not effect operation of the brake when applied in the other of the two modes.

Brakes of the kind described above are commonly used on tractors and like vehicles.

According to our invention in a disc brake of the kind set forth the pressure plate comprises separate inner and outer concentric rings for engagement with complementary inner and outer regions of the friction lining, an hydraulic annular piston and cylinder assembly acts directly on one of the rings to urge it axially into engagement with the disc, and balls are located in complementary oppositely inclined recesses in the other ring and in a complementary member so that upon relative angular movement therebetween the said other ring also moves axially due to the camming effect of the balls, the hydraulic piston and cylinder assembly being operated from a supply of hydraulic fluid, and the said other ring being movable angularly independently of the said one ring for parking or emergency braking by mechanically operable means.

This provides a servo effect for parking or emergency braking and, for normal service braking, can eliminate helical movement of the annular piston, conveniently by slidably coupling the said one ring and the cylinder against relative angular movement. This also provides different regions of the lining material for the different braking modes so that fade of the one does not effect the other.

In addition an hydraulic actuator may be incorporated to act on the said other ring in a direction to urge it angularly. This achieves a servo effect to produce a higher torque output when the brake is operated hydraulically, suitably for use in assisting the vehicle to achieve a "spin-turn" to facilitate steering.

Preferably the annular piston and cylinder assembly acts on the inner concentric ring, and the outer concentric ring has a radial lug on which the hydraulic actuator acts, either directly, or through a suitable linkage, the mechanically operable means also acting on the lug directly or through the linkage.

The radial lug may engage with an adjustable stop on the housing by means of which the angular retracted position of the outer concentric ring can be adjusted to compensate for wear of the friction linings. This then acts as a back-stop for the friction disc and determines the extent by which the outer concentric ring will move back in a retracted direction when the brake is released.

Uneven wear of the two regions of lining material is resisted by the inherent stiffness of the material of the plate carrying the lining material and, in any case, drag-wear may tend to even out the wear throughout the wear life of a friction disc. However, in the event of uneven wear becoming significant, the two concentric regions of lining material can be provided on two separate inner and outer friction rings which are splined together at adjacent edges to permit relative axial movement of the friction rings to take place.

Our brake can be "dry" or it can be of the "oil-immersed" type. In the former case a relatively small number of friction discs are incorporated so that uneven wear will not effect the brake significantly. Any uneven wear is likely only to effect the side of a disc which is remote from the actuating means. In the latter case, in which a plurality of friction discs are incorporated in a stack, lining wear takes place at an insignificant rate and therefore uneven wear is less of a problem. However any uneven wear will normally take place on the disc adjacent to the actuator, which may be splined as described above.

Two embodiments of our invention are illustrated in the accompanying drawings in which.

Figure 1:
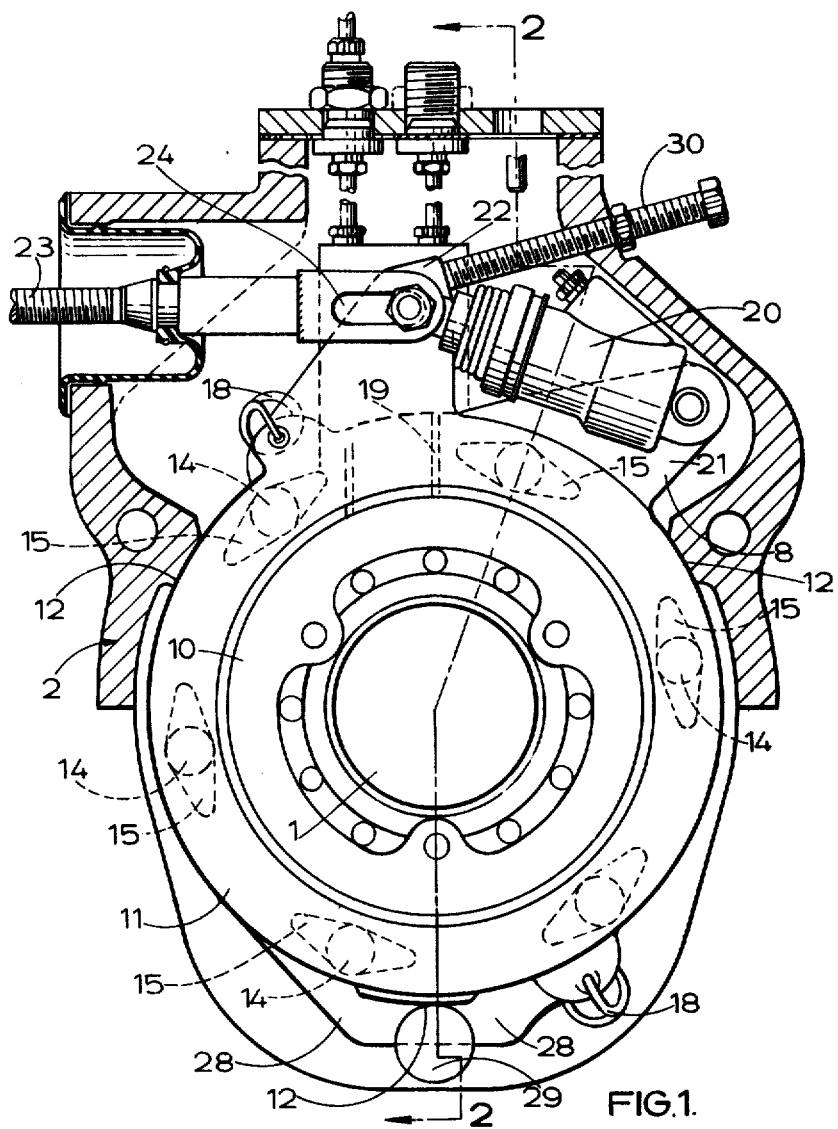
FIG. 1 is a plan of a disc brake.
Figure 2:
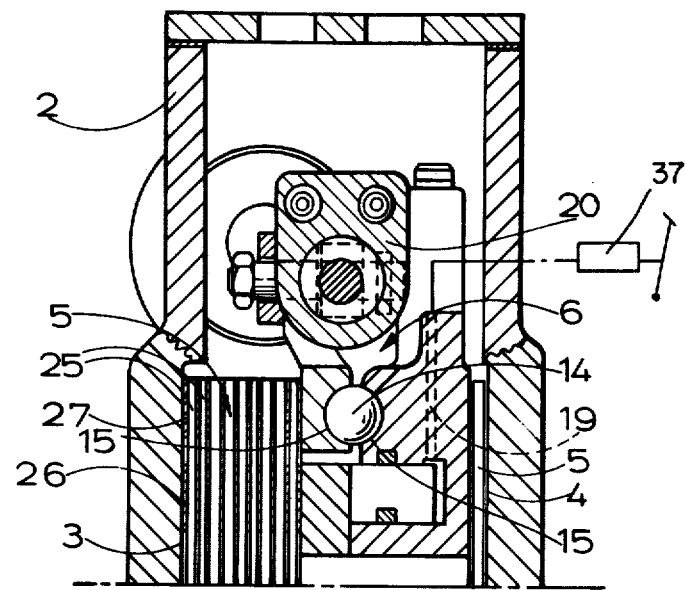
FIG. 2 is a section on the line 2—2 of FIG. 1.
Figure 2:
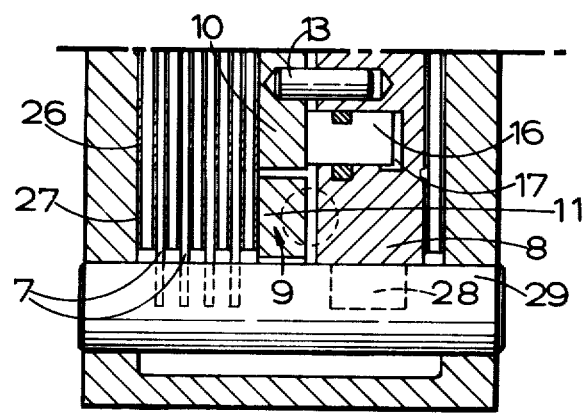
Figure 3:
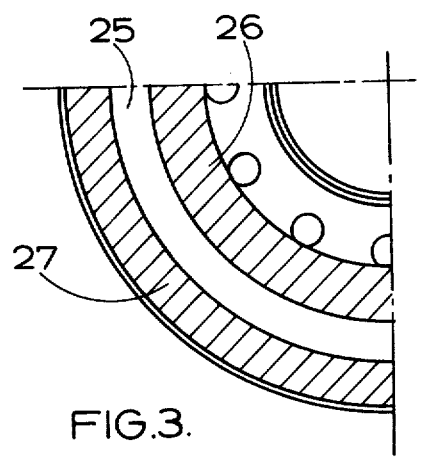
FIG. 3 is a plan of a friction disc incorporated in the brake of FIGS. 1 and 2.

The disc brake illustrated in FIGS. 1-4 of the accompanying drawings is adapted for braking a shaft 1 for transmitting drive to a wheel of a vehicle. The brake comprises a housing 2 into which the shaft 1 extends, the housing having at opposite ends radial braking surfaces 3,4 between which are located rotatable friction discs 5. The discs 5 are slidably keyed to the shaft 1.

An expander mechanism 6 is located between a single one of the discs 5, and the remainder of the discs 5 which are disposed in a stack with relatively stationary friction discs 7 disposed between adjacent pairs of discs 5 in the stack. The mechanism comprises two relatively angularly movable pressure plates 8,9 of annular outline with the plate 8 comprising a single member, and the plate 9 comprising separate inner and outer concentric rings 10,11. The plate 8 and the outer ring 11 are centred on angularly spaced pilots 12 in the housing, the inner ring 10 is keyed to the plate 8 for relative axial movement by means of angularly spaced guide pins 13, and the plate 8 is guided against rotation by the engagement of lugs 28 with a pin 29 which acts as a stop abutment and also comprises one of the pilots. Balls 14 are located in oppositely inclined co-operating recesses 15 in adjacent faces of the plate 8 and the outer ring 11. An annular piston 16 working in an annular hydraulic cylinder 17 in the plate 8 acts on the inner ring 10, and hydraulic fluid from a supply 37 can be admitted to the cylinder 17 through a passage 19 in the plate 8. Helical return springs 18 act between the plate 8 and the ring 11 to urge these components towards each other.

An hydraulic piston and cylinder assembly 20 acts at opposite ends between complementary lugs 21,22 on the plate 8 and on the ring 11 respectively. A transmission member 23 for applying the brake mechanically is coupled to the lug 22 through a lost-motion connection 24.

Each of the friction discs 5 in the stack comprises a metal plate 25 carrying on opposite sides two separate concentric inner and outer rings 26,27 of lining material which may have different co-efficients of friction and which are substantially superimposed upon the adjacent faces of the rings 10 and 11 which comprise the pressure plate 9.

When the brake is to be applied for normal service braking hydraulic fluid under pressure is supplied to the cylinder 17. The piston 16 urges the pressure plate 8 and the ring 10 relatively away from each other in an axial direction so that the discs 5 in the stack are urged together, and into engagement with the radial surface 3, and the other remaining disc 5 is urged into engagement with the radial surface 4. No servo-effect occurs since the plate 8 is held against rotation by the pin 29. Braking is initiated by the engagement of the ring 10 with the ring 26 of lining material.

When the brake is to be applied mechanically, in an emergency or for parking, the transmission member 23 is operative to move the ring 11 angularly with respect to the pressure plate 8 and the balls 14 tend to ride out of the recesses 15 to urge the plate 8 and the ring 11 axially apart. This urges the discs 5 in the stack together, and into engagement with the radial surface 3, and the other remaining disc 5 is urged into engagement with the radial surface 4. In this mode of operation, brake application is initiated by the engagement of the ring 11 with the ring 27 of lining material.

When the discs 5 are rotating in a normal forward direction the ring 11 is carried round with the discs 5 to provide a servo action to intensify the braking force.

Should the discs 5 be rotating in the opposite direction when the brake is applied, any angular movement of the outer ring 11 will be arrested by the engagement of the lug 22 with a stop abutment comprising a bolt 30 which is adjustably screwed into the housing 2 through a tapped opening, and any servo effect will be limited by the extent to which the plate 8 can move angularly, which is determined by any clearance between the pin 29 and a respective lug 28. Normally, therefore, no servo effect will occur when the brake is applied mechanically, with the friction discs 5 rotation in an opposite, reverse, direction.

To produce a higher torque output hydraulically in order to assist the vehicle achieve a "spin-turn", the hydraulic piston and cylinder assembly 20 is operated to urge the lug 22 relatively away from the lug 21, in consequence moving the ring 11 angularly to apply the brake in the same manner as that described above in connection with the mechanical operation.

Again a servo effect will normally be provided only when the vehicle is travelling with the wheels and the friction discs 5 rotating in a normal forward direction.

Both the cylinder 17 and the piston and cylinder assembly 20 may be operated simultaneously so that the servo effect can augment the normal service braking effect. In such a case both rings 10 and 11 engage with their respective rings 26 and 27 of lining material.

The bolt 30 is adjustable to compensate for wear of the friction linings 26 and 27 and acts as a back-stop for the friction discs 5 by determining the extent by which the outer concentric ring 11 can move back in a retracted direction under the influence of the springs 18, when the brake is released.

Uneven wear of the two rings 26,27 of lining material is resisted by the inherent stiffness of the metal plates 25 and, in any case, drag-wear may tend to even out the wear throughout the wear life of the discs 5 and 7.

Figure 4:
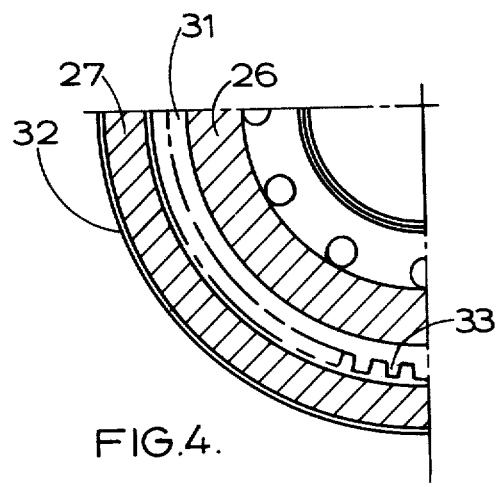
FIG. 4 is a plan similar to FIG. 3 but showing a modification.

The disc brake described above may be of the "oil-immersed" type in which case wear of the linings is minimal. However, in the event of the brake being of the "dry" type in which lining wear, and hence uneven wear, could become more significant, as shown in FIG. 4 the discs 5 may be constructed from two separate inner and outer concentric metal rings 31,32, each carrying a corresponding ring 26, 27 respectively, of lining material, with the metal rings 31 and 32 being splined together for relative axial movement as shown at 33. In such a construction relative wear of the rings 26,27 can take place. It is only necessary for the friction disc 5 with which the plate 9 engages directly to be splined and, when the brake is of the "dry-type" such a single friction disc 5 may replace all the friction discs 5 and 7 in the stack.

In the brake described above the transmission member 23, or a similar member, may be coupled to adjacent ends of a pair of toggle links of which the outer ends are coupled to the lugs 21 and 22. In such a construction the member 23 projects from the housing 2 in a radial direction.

Figure 5:
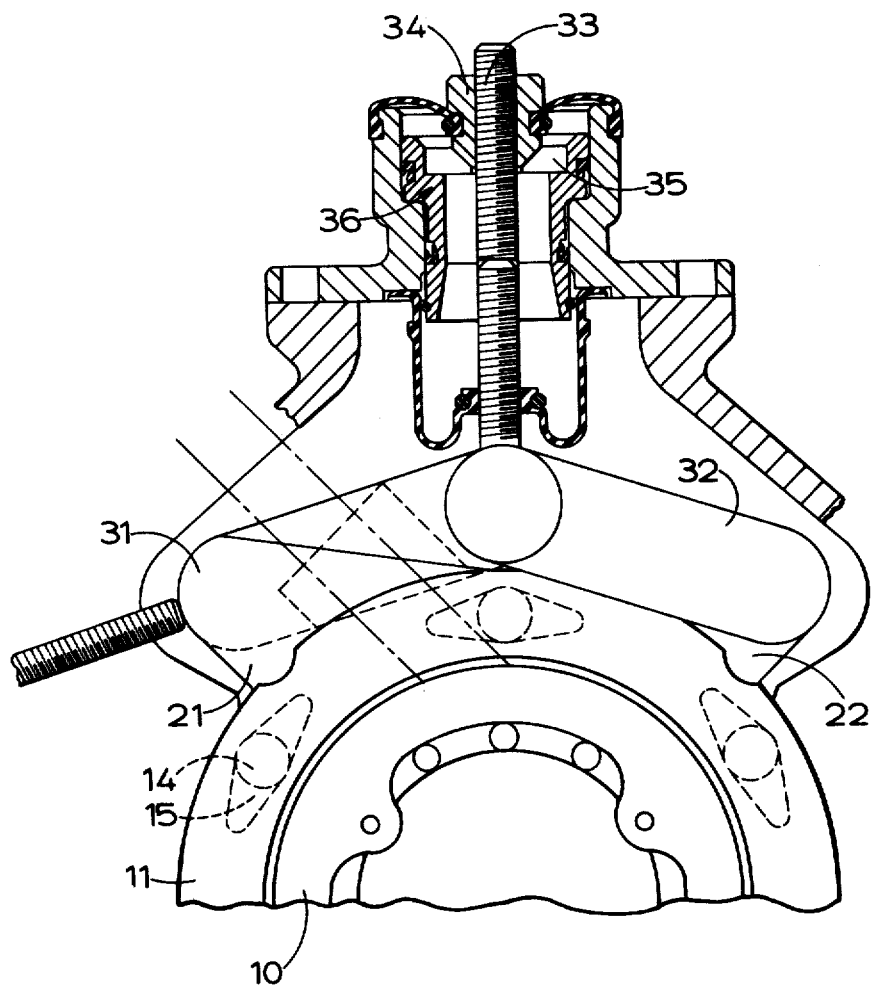
FIG. 5 is a view similar to FIG. 1 of a modified brake.

In the modified brake illustrated in FIG. 5 the piston and cylinder assembly 20 is omitted and the position of the two lugs 21 and 22 is reversed. The lugs 21 and 22 are coupled to the outer ends of a pair of toggle links 31,32 of which the inner ends are coupled to a rod 33 provided at its outer end with a part-spherical thrust member 34.

An hydraulic piston 35 of stepped outline working in a cylinder 36 can act at its outer end on the thrust member 34 for service braking, and the rod 33 can be withdrawn through the piston 35 for parking or emergency braking.

When the brake is applied to facilitate a "spin-turn" the cylinder 36 is pressurised so that the plates 8 and 9 are separated axially as described above with relative angular movement being imparted to the plates by the toggle links 31,32. Similarly, for emergency or parking braking, the brake is applied only by relative angular movement between the plate 8 and the ring 11.

The construction and operation of the brake of FIG. 5 is otherwise the same as that of FIGS. 1-4 and corresponding reference numerals have been applied to corresponding parts.

In the brakes described above, keying the pressure plate 8 against angular movement with respect to housing 2 has the advantage that normal hydraulic pipes can be used to supply fluid to the cylinder 17, rather than flexible hoses which are less satisfactory and would be required if the pressure plate 8 was adapted to move angularly. Also the recesses 15 are double ended to provide a servo effect for both direction of disc rotation, as permitted by the arrangement of the pressure plates 8 and 9 which will depend upon whether the brake is to be used with a wheel on a near side or an off side of a vehicle.

In a modification of the brakes described above the friction disc 5 between the expander mechanism 6 and the face 4 can be omitted. In such a construction the pressure plate 8 can be fast with the housing 2 itself or constituted by an end wall of the housing 2 itself.

In another modification the position of the rings 10 and 11 constituting the pressure plate 9 can be reversed so that the piston 16 is housed in the then outer ring, and the recesses 15 are located in the then inner ring.

I claim:

1. A disc brake comprising a stationary housing having at least one radial surface, at least one rotatable friction disc in said housing adapted to cooperate with said radial surface to apply said brake, actuating means for urging said friction disc into cooperation with said radial surface, hydraulically operable means for applying said brake, a supply of hydraulic fluid for supplying fluid to said hydraulically operable means, and mechanically operable means for applying said brake for parking or emergency braking, said actuating means incorporating at least one pressure plate and a complementary member, adjacent faces of said pressure plate and said complementary member having complementary oppositely inclined recesses, balls located in said oppositely inclined recesses, and an hydraulic piston and cylinder assembly for urging said pressure plate into engagement with said friction disc, said pressure plate comprising separate inner and outer concentric rings and said friction disc carrying complementary inner and outer regions of friction lining material, said piston and cylinder assembly acting directly on one of said rings, to urge it axially into engagement with a complementary one of said regions of said friction lining material so that said friction disc is urged into cooperation with said radial surface, said recesses being disposed in the other of said rings so that upon relative angular movement between said other ring and said complementary member said other ring moves axially into engagement with the other of said regions of said friction lining material due to a camming effect of said balls as they tend to ride out of said recesses so that said friction disc is urged into cooperation with said radial surface, said piston and cylinder assembly being operated from said supply of hydraulic fluid, and said other ring being angularly movable independently of said one ring by said mechanically operable means.

2. A disc brake as claimed in claim 1, wherein said piston and cylinder assembly comprises an annular hydraulic cylinder and an annular piston working in said cylinder, said one ring and said cylinder being slidably coupled against relative angular movement.

3. A disc brake as claimed in claim 2, further comprising another radial surface in the stationary housing and another rotatable friction disc adapted to cooperate with said other radial surface, said complementary member comprising another pressure plate for engagement with said other friction disc, and said hydraulic cylinder being defined in said other pressure plate so that said piston works in said cylinder to urge said one ring and said other pressure plate axially apart into respective engagement with said one and said other friction discs thus urging said friction discs into respective co-operation with said radial surfaces to apply said brake.

4. A disc brake as claimed in claim 3, wherein angularly spaced guide pins are provided for keying said other pressure plate to said one ring, a stop abutment is provided in the housing, and lugs are provided on said other pressure plate for engagement with said stop abutment, said guide pins keying said other pressure plate for axial movement relative to said one ring, and said engagement of said lugs with said stop abutment guiding said other pressure plate against rotation relative to said housing.

5. A disc brake as claimed in claim 1, incorporating an hydraulic actuator for urging said other ring angularly relative to said complementary member.

6. A disc brake as claimed in claim 5, wherein a radial lug is provided on said outer concentric ring, said mechanically operable means and said hydraulic actuator both acting on said radial lug to urge said outer concentric ring angularly relative to said complementary member, and said annular piston and cylinder assembly acting on said inner concentric ring to urge it axially away from said complementary member.

7. A disc brake as claimed in claim 6, wherein said hydraulic actuator comprises another hydraulic piston and cylinder assembly, said other piston and cylinder assembly also acting on said radial lug to urge said outer concentric ring angularly relative to said complementary member.

8. A disc brake as claimed in claim 6, wherein a complementary radial lug is provided on said complementary member and a toggle linkage is coupled to said radial lugs, said hydraulic actuator and said mechanically operable means both acting through said linkage to cause said outer concentric ring to move angularly relative to said complementary member.

9. A disc brake as claimed in claim 6, wherein a stop member is provided in the housing, said radial lug on said outer concentric ring being engageable in a retracted position with said stop member, and said stop member being adjustable to alter said retracted position in order to compensate for wear of said friction lining material on said friction disc.

10. A disc brake as claimed in claim 1, wherein said friction disc carries separate inner and outer concentric rings of friction lining material.

11. A disc brake as claimed in claim 10, wherein said friction disc comprises a single plate.

12. A disc brake as claimed in claim 10, wherein said friction disc comprises separate inner and outer concentric friction rings splined together for relative axial movement, each friction ring carrying a corresponding ring of friction lining material.

13. A disc brake as claimed in claim 10, incorporating a stack of friction discs disposed between said pressure plate and said radial surface in the housing, said stack comprising a plurality of rotatable friction discs, each adjacent pair of said rotatable friction discs having disposed therebetween a relatively stationary friction disc, and each rotatable friction disc comprising a metal plate which carries on opposite sides two separate concentric inner and outer rings of friction lining material.

14. A disc brake as claimed in claim 13, wherein the rotatable friction disc in said stack which is adjacent to said pressure plate comprises separate inner and outer concentric friction rings which are splined together for relative axial movement, each friction ring carrying a corresponding ring of friction lining material.

15. A disc brake as claimed in claim 10, wherein said separate concentric rings of lining material have different co-efficients of friction.

* * * * *